United States Patent [19]

Mitamura et al.

[11] 4,090,891

[45] May 23, 1978

[54] WATER-SOLUBLE POLYMERS DERIVED FROM COPOLYMERIZATION OF DIENE AND MALEIC ACID OR MALEIC ACID DERIVATIVE AND AQUEOUS QUENCHING FLUIDS PREPARED THEREFORE

[75] Inventors: Kazuyoshi Mitamura; Hiroyuki Itoh, both of Yokohama, Japan

[73] Assignee: Nippon Oil Company Limited, Tokyo, Japan

[21] Appl. No.: 767,445

[22] Filed: Feb. 10, 1977

[30] Foreign Application Priority Data

Feb. 6, 1976 Japan .................................. 51-19411

[51] Int. Cl.² .............................................. B23K 35/24
[52] U.S. Cl. ....................................... 148/28; 148/29; 252/74

[58] Field of Search ............... 148/27, 28, 29; 252/73, 252/74, 76, 78, 56 R, 56 D

[56] References Cited

U.S. PATENT DOCUMENTS

| | | | |
|---|---|---|---|
| 2,499,984 | 3/1950 | Beavers et al. | 252/56 R |
| 3,224,910 | 12/1965 | McEwen | 148/28 |
| 3,281,288 | 10/1966 | Carver et al. | 148/28 |
| 4,020,000 | 4/1977 | Suen et al. | 252/56 D |

*Primary Examiner*—Walter R. Satterfield

[57] ABSTRACT

Water-soluble polymers derived from the copolymerization of a conjugated diene and maleic acid and/or a maleic acid derivative having certain anionic and cationic components are disclosed. When dissolved in aqueous media, the polymers are useful as quenching agents for metals.

7 Claims, No Drawings

WATER-SOLUBLE POLYMERS DERIVED FROM COPOLYMERIZATION OF DIENE AND MALEIC ACID OR MALEIC ACID DERIVATIVE AND AQUEOUS QUENCHING FLUIDS PREPARED THEREFORE

BACKGROUND OF THE INVENTION

1. Field of the Invention

This invention relates to novel aqueous quenching fluids. More particularly, it is concerned with aqueous macromolecular quenching agents characterized by excellent metal hardenabilities.

2. Description of the Prior Art

Heretofore, mineral quenching oil have widely been used as the metal quenching agent. As the mineral oil quenching is very slow in rate of metal quenching, it is distinctly characterized by causing neither quenching crack nor strain in the product. On the other hand, it is a disadvantage of mineral oil that hardening is difficult due to slow rate of quenching metals. Moreover, it is a remarkable disadvantage that as the oil is attached to the surface of metals during the quenching complicated procedures for removing the attached oil are necessary.

In order to overcome these disadvantages of mineral quenching oil a variety of aqueous quenching agents have been developed. Representative of the aqueous quenching agents are aqueous polyvinyl alcohol solutions and aqueous polyalkylene glycol solutions such as those of polyethylene glycol, polypropylene glycol and polyoxyethylenepolyoxypropylene glycol. These aqueous quenching agents are capable of rapid metal quenching as well as of satisfactory hardening. Besides, it is unnecessary or very easy to remove the material attached to the metal surface after the quenching. However, these aqueous quenching agents are disadvantageous in that quenching crack is not satisfactorily prevented and, in some cases, quenching strain is produced. It is also disadvantageous that, with aqueous quenching agents of a low solute concentration such as polyvinyl alcohol, metal quenching is greatly influenced by liquid temperature. Moreover, with aqueous quenching agents with a high solute concentration such as of polyalkylene glycols, it is necessary in order to prevent quenching crack to employ the expensive solute at a high concentration.

SUMMARY OF THE INVENTION

As a result of extensive investigations for improving the above-mentioned disadvantageous properties of the prior-art mineral oil or aqueous quenching agents we have discovered novel aqueous quenching fluids according to the present invention. They are characterized by effecting high-speed quenching as well as producing satisfactory hardening, no quenching crack or strain caused, easy cleansing process after quenching, easy control of the quenching agent, and also being inexpensive. It is also a distinctive characteristic of the quenching fluids according to the invention that waste from the cleansing can very easily be treated. As a matter of fact, this invention provides quenching fluids which enable safe, firm and inexpensive hardening of metals.

DESCRIPTION OF THE INVENTION

The aqueous quenching fluids of the invention comprise as the essential components:

(A) a macromolecular or polymer anion from a conjugated diene-maleic acid derivative copolymer containing recurring units represented by the formulae

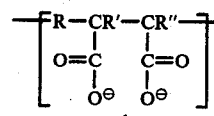 (I)

and

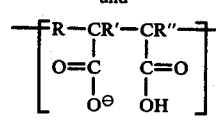 (II)

wherein R represents a conjugated diene unit in the copolymer, R' and R" respectively represent hydrogen, a halogen atom or an organic radical containing from 1 to 18 carbon atoms, and acid groups are partly or entirely dissociated, (B) at least one cations selected from the group consisting of alkali metal cations, $Na^+$, $K^+$ and $Li^+$, ammonium ion and substituted ammonium ions represented by $R_1R_2R_3R_4N^+$ wherein $R_1$, $R_2$, $R_3$ and $R_4$ are respectively selected from the group consisting of hydrogen, and alkyl-, cycloalkyl- and aryl-groups containing from 1 to 18 carbon atoms.

(C) $Mg^{2+}$ (D) one or more anions selected from the group consisting of inorganic anions such as $Cl^-$, $Br^-$, $NO_3^-$, $MnO_4^-$, $HCO_3^-$, $ClO_4^-$, $OH^-$ and $SO_4^{2-}$ and carboxylate anions such as $HCOO^-$, $CH_3COO^-$, $CH_3CH_2COO^-$ and

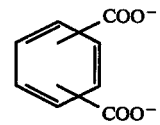, and (E) water.

The quenching agents of the invention are of a unique property that they are liquid at a lower temperature but are solid or gel at a higher temperature and the change between liquid and solid is reversible. This leads to the satisfactory hardening of metals, because they have a quenching ability approximately equal to that of water at the early stage and subsequently, due to their being gel near the surface of metal, quenching of the metal becomes slower so that there is caused neither quenching crack nor quenching strain. Since the gelled quenching agent after the quenching is reversed to a liquid, they are characterized also by a very easy cleansing process.

To describe the quenching agents according to the invention in more details, the compound (A) is a macromolecular anion from a conjugated diene-maleic acid derivative copolymer containing recurring units represented by the general formulae

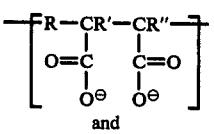 (I)

and

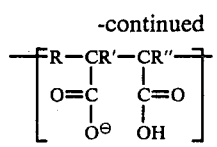

(II)

wherein R represents a conjugated diene unit in the copolymer, and R' and R" respectively represent hydrogen, a halogen atom or an organic radical containing from 1 to 18 carbon atoms and the acid groups are partly or entirely dissociated. The degree of the dissociation may be represented in terms of the ratio of [I] to [II]. The ratio of [I] to [II] may be from 100:0 to 0:100 and preferably is in the range from 100:0 to 50:50. The macromolecular, or polymer, anion may be prepared by reacting a conjugated diene-maleic acid derivative copolymer with a base in water. The conjugated dienes employed as a component of the starting copolymer are ethylenically unsaturated aliphatic or cyclic diene compounds containing from 4 to 20 carbon atoms. There may be mentioned, for example, butadiene, isoprene, chloroprene, 2,3-dimethylbutadiene, piperilene, 2,3-dichlorobutadiene, 2-methyl-1,3-hexadiene, 1-methoxy-1,3-butadiene and the like. Butadiene, isoprene, piperilene and chloroprene are particularly preferred. The maleic acid derivative includes maleic acid, monoesters of maleic acid, diesters of maleic acid, maleic anhydride, citraconic acid, monochloromaleic anhydride, dichloromaleic anhydride and the like. The conjugated diene-maleic acid derivative copolymer used as the starting material is an alternate copolymer with a ratio of the conjugated diene unit to the maleic acid derivative unit of approximately 1:1, which has a value of intrinsic viscosity from 0.01 to 6.0, preferably from 0.1 to 3.0 as determined at 30° C.

The (starting) copolymers of a conjugated diene and a maleic acid derivative are prepared by copolymerization process using a radical-generating catalyst, or under ultraviolet or ionizing radiation, or in the presence of an organometal catalyst or the like. Any of the copolymers obtained by these methods may be employed.

The component (B) of the aqueous quenting agents of the invention is one or more of alkali metal cations consisting of Na$^+$, K$^+$ and Li$^+$, and quaternary ammonium cations (ammonium ion or substituted ammonium ions) represented by $R_1R_2R_3R_4N^+$ wherein $R_1$, $R_2$, $R_3$ and $R_4$ are respectively selected from the group consisting of hydrogen and alkyl-, cycloalkyl- and aryl-groups containing from 1 to 18, preferably from 1 to 6, carbon atoms. In carrying out a reaction of the conjugated diene-maleic acid derivative copolymer with a variety of bases in water in order to produce a desired degree of dissociation, the component (B) is introduced as the counterpart anion for the macromolecular anion. The component (B) is preferably in an amount from 0.5 to 5.0 equivalents on the basis of the maleic acid derivative unit, more preferably in the range from 0.5 to 2.0 equivalents. Equivalent as used in this invention means that to one mole of the maleic acid derivative unit corresponds one gram ion irrespective of the ionic charge.

Another essential component of the aqueous quenching agents of the invention, (C), is magnesium ion Mg$^{2+}$, the amount of which is from 0.3 to 2.0, and more preferably from 0.5 to 1.5 equivalents on the basis of the maleic acid derivative unit in the conjugated diene-maleic acid derivative copolymer.

The component (D) is an anion $X^{n-}$ wherein $n$ is an integer 1 or 2 which is an organic carboxylate anion that is capable of forming a water-soluble magnesium compound or alkali metal compound, including inorganic anions such as Cl$^-$, Br$^-$, MnO$_4^-$, HCO$_3^-$, ClO$_4^-$, NO$_3^-$, OH$^-$, SO$_4^{2-}$ and the like and organic carboxylate anions such as HCOO$^-$, CH$_3$COO$^-$, CH$_3$CH$_2$COO$^-$,

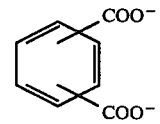

and the like. At least one of the anions may be employed. The amount of $X^{n-}$ is from 0.5 to 7.0 equivalents, preferably from 0.5 to 3.5 equivalents on the basis of the maleic acid derivative unit in the conjugated diene-maleic acid derivative copolymer used as the starting material for the component (A).

The essential component (E) according to the invention is water. The water is in an amount from 5 to 1000 times the total weight of the components (A), (B), (C) and (D). Preferably, it is in an amount from 10 to 500 times as much.

In the absence of any of the above-cited five components constituting the aqueous quenching fluid of the invention there will not be afforded a quenching fluid characteristic of the present invention. Also, if the relative amounts of the components do not meet the requirements according to the invention, a quenching agent of good ability cannot be produced.

Various additives may be added to the aqueous quenching fluid of the invention provided that they do not produce adverse effects on the metal-quenching ability and other properties. For example, rust preventives may be added for rust proof of the metal to be treated, antifungal or animicrobial agents for prevention of microbial contamination of the quenching agent, and antifoaming agents for prevention of foaming of the quenching agent.

DESCRIPTION OF PREFERRED EMBODIMENTS

The aqueous quenching fluids according to the invention will be described in more detail with reference to the following examples:

EXAMPLES 1 – 5 AND COMPARATIVE EXAMPLE 1

In a 3 liter separable flask was placed 152.2 g. of the butadiene-maleic anhydride copolymer prepared by a polymerization in an acetone solvent using an azobisisobutyronitrile catalyst (intrinsic viscosity of 0.64 as determined in cyclohexanone at 30° C, composed of butadiene unit and maleic anhydride unit in a ratio of about 1:1), to which was added 1900 ml. of 1N aqueous solution of sodium hydroxide. The mixture was thoroughly stirred to solution.

To the solution was then added drop by drop the aqueous solution of magnesium chloride prepared from 183.0 g. of magnesium chloride hexahydrate and 800 ml. of water. After completion of the addition of magnesium chloride, stirring was continued for additional one hour, and then, the reaction mixture was allowed to stand overnight to give two separate layers. 1482 g. of a viscous lower layer was recovered by the removal of the upper-layer aqueous solution. Composition of the viscous lower layer was as follows:

| | Macromolecular anions [I]:[II] = 90:10. |
|---|---|
| $Mg^{2+}$ | 0.74 eq. (on the basis of the maleic acid unit in the polymer) |
| $Na^+$ | 1.10 eq. (on the basis of the maleic acid unit in the polymer) |
| $Cl^-$ | 0.72 eq. (on the basis of the maleic acid unit in the polymer) |
| Water | 85.2 % by weight. |

Then, water was distilled off from 1000 g. of the viscous lower layer by means of a rotary evaporator, followed by drying under reduced pressure. There was obtained 148 g. of a powdery solid [sample I]. Aqueous quenching fluids were prepared by dissolving the resulting solid powders in pure water respectively to 0.5, 1, 1.5, 2 and 3% by weight. Quenching abilities of the aqueous quenching fluids thus prepared were determined according to JIS-K2526 Testing Method for Cooling Ability of Treating Oils. The test was carried out at a liquid temperature of the quenching agent of 30° C. The results are shown in Table 1. For reference, Table 1 covers the result of the same quenching ability test carried out with an aqueous solution of 15% by weight of polyalkylene glycol (molecular weight 20,000) containing 75% by weight of ethylene oxide unit and 25% by weight of propylene oxide unit. These results indicate that the quenching fluids of this invention are excellent even quenching agents at lower concentrations.

Table 1

| Aqueous quenching agent | Charact-* eristic temperature (° C) | Vapor blanket cooling stage | Cooling time from 800° C. to 400° C. (sec.) |
|---|---|---|---|
| Example 1 Sample I 0.5% by weight | 609 | 1.57 | 1.64 |
| Example 2 Sample I 1.0 by weight | 576 | 2.02 | 2.19 |
| Example 3 Sample I 1.5 by weight | 491 | 4.59 | 4.68 |
| Example 4 Sample I 2.0 by weight | 408 | 6.27 | 6.33 |
| Example 5 Sample I 3.0 by weight | 320 | 9.93 | 6.80 |
| Comparative Example 1 Polyalkylene glycol 15% by weight | 539 | 4.50 | 4.63 |

*Temperature at which the vapor blanket has collapsed.

EXAMPLE 6 AND COMPARATIVE EXAMPLE 2

In a 3 liter separable flask was dissolved 152.2 g of a butadiene-maleic anhydride alternate copolymer prepared by the method in Example 1 (intrinsic viscosity of 0.55 as determined in cyclohexanone at 30° C.), 1900 ml. of 1N aqueous ammonia with stirring. To the solution was then added drop by drop by aqueous solution of magnesium sulfate (1 mol./l.) and the reaction solution was stirred for additional one hour. When the solution [Sample II] placed in a test tube was heated, the whole system became gel. When the gel was cooled by cold water, it was reversed to the original solution.

Sample II was subjected to the quenching test according to the method in Example 1 to find that characteristic temperature was 486° C. and vapor blanket stage time was 4.01 sec. Then, the quench hardening test was carried out with Sample II. The test method involved heating a steel specimen 25 mm $\phi$ × 50 mm. at 850° C. for 30 min. followed by cooling by immersing in Sample II at 30° C. Surface hardness of the resulting steel specimen was measured. The results are shown in Table 2. For comparison's sake, the result using water as a quenching agent is also shown. The results indicate that the quenching fluids of the invention is as good as water for the surface hardness.

Table 2

| | Surface hardness of quenched steel.* | | |
|---|---|---|---|
| Quenching agent | Steel | S-45C steel | SCM3 steel |
| Example 6 | Sample II | 59 | 56 |
| Comparative Example 2 | Water | 59 | 53 |

*Rockwell C scale.

EXAMPLE 7 AND COMPARATIVE EXAMPLE 3

In a 3 liter separable flask was dissolved 152.2 g of the butadiene-maleic anhydride alternate copolymer prepared by the method in Example 1 (intrinsic viscosity of 0.71 as determined in cyclohexanone solution at 30° C) in 1800 ml. of 1N solution of potassium hydroxide. The mixture was thoroughly stirred to solution. The solution of polymer potassium salt was divided into two. The half was used for the preparation of Sample III and the remaining as the starting material in Comparative Example 3.

The preparation of Sample III was as follows: To the above-mentioned solution of polymer potassium salt (970 g.) was added an aqueous solution of magnesium nitrate (1 mol./l.) followed by stirring for one hour. Then, the reaction was heated on a hot water bath to give two separate layers. The lower layer became a rubbery solid. After complete removal of the upper layer the lower layer was cooled to give a liquid. Sample III was prepared by diluting 250 g. of the liquid with 2 liter of pure water.

Composition of Sample III is as follows:

| | Macromolecular anions [I]:[II] = 80:20 |
|---|---|
| $Mg^{2+}$ | 0.68 eq. (on the basis of the maleic acid unit in the polymer) |
| $K^+$ | 1.20 eq. (     "          "     ) |
| $NO_3^-$ | 0.74 eq. (     "          "     ) |
| Water | 98.3 % by weight. |

The sample of Comparative Example 3 was prepared by diluting 500 g. of the above-mentioned aqueous solution of polymer potassium salt with 1500 ml. of pure water (Polymer concentration ca. 1.9% by weight).

Quenching ability test was carried out with Sample III and the sample of Comparative Example 3 according to the method in Example 1.

Table 3

| | Charact- | Vapor | Cooling time |

Table 3-continued

| Aqueous quenching agent | Aqueous quenching agent | eristic temperature (° C.) | blanket stage time (sec.) | from 800° C to 400° C. (sec.) |
|---|---|---|---|---|
| Example 7 | Sample III | 495 | 4.41 | 4.51 |
| Comparative Example 3 | Solution of butadiene-maleic acid copolymer potassium salt (polymer concentration 1.9% by weight) | 613 | 0.92 | 0.99 |

Then, quenching crack test was carried out for Sample III and the sample of Comparative Example 3 with a test piece of carbon tool steel (SK-3). Measurements were also made for quenching hardness, quenching strain and quenching crack after immersing the test piece in advance heated in an electric furnace at 820° C. for 30 min. while maintainining the liquid temperature at 30° C. The results are shown in Table 4.

Table 4

|  |  | Quenching hardness* | Quenching strain | Quenching crack |
|---|---|---|---|---|
| Example 7 | Sample III | 63.3–65.1 | 0.059 | None |
| Comparative Example 3 | Solution of butadiene-maleic acid copolymer potassium salt (polymer concentration 1.9% by weight) | 64.9–65.4 | 0.244 | Caused |

*Rockwell C scale.

EXAMPLE 8 AND COMPARATIVE EXAMPLE 4

In 1-l. of an aqueous solution of ethylamine (1 mol./l.) was dissolved 90.1 g. of an isoprene-citraconic anhydride copolymer prepared in an acetone solution using an azobisisobutyronitrile catalyst (intrinsic viscosity of 0.51 as determined in cyclohexanone solution at 30° C. and composition of the isoprene unit : citraconic acid unit of about 1:1). Sample III of aqueous quenching agent was prepared by gradually adding 300 ml. of a magnesium bromide solution (1 mol./l.) to the polymer solution followed by addition of 1500 ml. of pure water. Quenching ability test was carried out on the aqueous quenching agent in the same way as in Example 1 with the results given below.

Characteristic Temperature 403° C.
Vapor blanket stage time 9.10 sec.
Cooling time from 800° to 400° C. 9.84 sec.

Quenching strain test was also carried out according to the method in Example 7 to give the results as shown in Table 5.

Table 5

Quenching strain-preventive effects of aqueous quenching agents.
Liquid temperature 30° C., test piece (carbon tool Steel SK-3)
Conditions for heating the test piece 820° C × 30 min.

|  | Quenching agent | Quenching hardness* | Quenching strain | Quenching crack |
|---|---|---|---|---|
| Example 8 | Sample IV | 61.3–64.9 | 0.051 | None |
| Comparative Example 4 | Polyalkylene glycol 5% by weight | 64.2–65.1 | 0.197 | Caused |

*Rockwell C Scale.

In Table 5 were also shown the results with a 5% by weight aqueous solution of polyalkylene glycol containing 70% by weight of ethylene oxide unit and 30% by weight of propylene oxide unit (molecular weight 15,000) for comparison's sake.

EXAMPLES 9–13

In a 5-l. separable flask was placed 152.2 g. of the butadiene-maleic anhydride alternate copolymer prepared by the method in Example 1 (intrinsic viscosity of 0.63 as determined in cyclohexanone at 30° C.), to which was added 1800 ml. of 1N aqueous solution of potassium hydroxide to a solution. Then, 650 ml. of an aqueous solution of magnesium chloride (1 mol./l.) was gradually added, followed by addition of 2000 ml. of pure water to prepare Sample V.

Quenching ability test was carried out on Sample V at various liquid temperatures in the same way as in Example 1. The results obtained are shown in Table 6.

Table 6

Influence of the liquid temperature upon the quenching ability (Sample V).

|  | Liquid temperature (° C.) | Characteristic temperature (° C.) | Vapor blanket stage time (sec.) | Cooling time from 800° C. to 400° C. (sec.) |
|---|---|---|---|---|
| Example 9 | 25 | 600 | 1.90 | 2.16 |
| Example 10 | 30 | 589 | 2.05 | 2.37 |
| Example 11 | 35 | 571 | 2.33 | 2.52 |
| Example 12 | 40 | 558 | 2.54 | 2.83 |
| Example 13 | 45 | 541 | 2.95 | 3.22 |

As clearly seen from Table 5, quenching ability of the quenching fluid is very slightly influenced by the light temperature.

We claim:

1. An aqueous quenching fluid consisting essentially of
(a) a conjugated diene-maleic acid derivative copolymer containing recurring anionic units represented by the formulae:

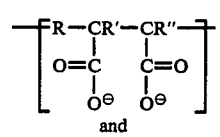

(I)

and

-continued

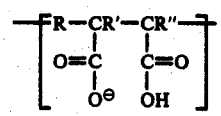
(II)

wherein R represents a conjugated diene unit, R' and R", respectively, represent hydrogen, a halogen atom or an organic radical containing from 1 to 18 carbon atoms, and the acid groups are partly or entirely dissociated in such a way that the ratio of (I) to (II) is between 100:0 and 0:100;

(b) at least one cation selected from the group consisting of alkali metal cation, ammonium ion and substituted ammonium ion represented by $R_1R_2R_3R_4N^+$ wherein $R_1$, $R_2$, and $R_3$, and $R_4$, respectively, are selected from the group consisting of hydrogen, alkyl-, cycloalkyl-, and aryl-groups containing from 1 to 18 carbon atoms, said cation being present in an amount from about 0.5 to about 5.0 equivalents on the basis of the maleic acid derivative unit in component (a);

(c) $Mg^{++}$ in an amount from about 0.3 to about 2.0 equivalents on the basis of the maleic acid derivative unit in component (a); and, (d) at least one anion capable of forming a water-soluble salt with $Mg^{++}$ or alkali metal ions in an amount from about 0.5 to about 0.7 equivalents on the basis of the maleic acid derivative unit in component (a).

2. A water-soluble polymer according to claim 1 wherein the conjugated diene unit in component (a) is derived from butadiene, isoprene, piperilene, chloroprene, 2,3-dimethylbutadiene, 2,3-dichlorobutadiene, 2-methyl-1,3-hexadiene, or 1-methoxy-1,3-butadiene.

3. A water-soluble polymer according to claim 1 wherein the maleic acid derivative unit in component (a) is derived from maleic acid, monochloromaleic acid, dichloromaleic acid or citraconic acid.

4. A water-soluble polymer according to claim 1 wherein the anions in component (d) is selected from the group consisting of $Cl^-$, $Br^-$, $NO_3^-$, $ClO_4^-$, $HCO_3^-$, $OH^-$, $SO_4^{2-}$, $MnO_4^-$ and organic carboxylate anions.

5. An aqueous quenching fluid consisting essentially of a quenching effective amount of components (a), (b), (c), and (d) of claim 1 dissolved in water.

6. The aqueous quenching fluid of claim 5 in which water is present in an amount from 5 to 1,000 times as much as the total amount of components (a), (b), (c), and (d).

7. In a process for quenching metals, the improvement which comprises applying an aqueous quenching fluid of claim 9 to hot metal.

* * * * *

UNITED STATES PATENT AND TRADEMARK OFFICE
CERTIFICATE OF CORRECTION

PATENT NO. : 4,090,891
DATED : May 23, 1978
INVENTOR(S) : Kazuyoshi Mitamura et al.

It is certified that error appears in the above-identified patent and that said Letters Patent are hereby corrected as shown below:

Claim 7, line 3, "9" should read as --5--.

Signed and Sealed this

Seventeenth Day of October 1978

[SEAL]

Attest:

RUTH C. MASON
*Attesting Officer*

DONALD W. BANNER
*Commissioner of Patents and Trademarks*